US009990939B2

(12) United States Patent
Wolff et al.

(10) Patent No.: US 9,990,939 B2
(45) Date of Patent: Jun. 5, 2018

(54) METHODS AND APPARATUS FOR BROADENED BEAMWIDTH BEAMFORMING AND POSTFILTERING

(71) Applicant: NUANCE COMMUNICATIONS, INC., Burlington, MA (US)

(72) Inventors: Tobias Wolff, Neu Ulm (DE); Tim Haulick, Blaubeuren (DE); Markus Buck, Biberach (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days. days.

(21) Appl. No.: 15/306,767

(22) PCT Filed: Jul. 2, 2014

(86) PCT No.: PCT/US2014/045202
§ 371 (c)(1),
(2) Date: Oct. 26, 2016

(87) PCT Pub. No.: WO2015/178942
PCT Pub. Date: Nov. 26, 2015

(65) Prior Publication Data

US 2017/0053667 A1 Feb. 23, 2017

Related U.S. Application Data

(60) Provisional application No. 62/000,137, filed on May 19, 2014.

(51) Int. Cl.

| | |
|---|---|
| ***G10L 15/00*** | (2013.01) |
| ***G10L 25/84*** | (2013.01) |
| ***G10L 21/0208*** | (2013.01) |
| ***G10L 21/0232*** | (2013.01) |
| ***G10L 25/21*** | (2013.01) |
| *G10L 21/0216* | (2013.01) |

(52) U.S. Cl.
CPC .......... *G10L 25/84* (2013.01); *G10L 21/0208* (2013.01); *G10L 21/0232* (2013.01); *G10L 25/21* (2013.01); *G10L 2021/02082* (2013.01); *G10L 2021/02166* (2013.01)

(58) Field of Classification Search
USPC ................. 704/233–236, 246, 247, 251, 252
See application file for complete search history.

(56) References Cited

U.S. PATENT DOCUMENTS

| | | | |
|---|---|---|---|
| 8,705,759 | B2 | 4/2014 | Wolff et al. |
| 2010/0017206 | A1 | 1/2010 | Kim et al. |

(Continued)

OTHER PUBLICATIONS

PCT Search Report and Written Opinion of the ISA dated Jan. 21, 2015; for PCT Pat. App. No. PCT/US2014/045202; 9 pages.

(Continued)

*Primary Examiner* — Leonard Saint Cyr
(74) *Attorney, Agent, or Firm* — Daly, Crowley Mofford & Durkee, LLP

(57) ABSTRACT

Methods and apparatus for broadening the beamwidth of beamforming and postfiltering using a plurality of beamformers and signal and power spectral density mixing, and controlling a postfilter based on spatial activity detection such that de-reverberation or noise reduction is performed when a speech source is between the first and second beams.

20 Claims, 10 Drawing Sheets

(56) References Cited

U.S. PATENT DOCUMENTS

| | | | | |
|---|---|---|---|---|
| 2012/0008807 | A1* | 1/2012 | Gran | H04R 25/407 381/313 |
| 2012/0020485 | A1* | 1/2012 | Visser | H04R 3/005 381/57 |
| 2012/0093333 | A1* | 4/2012 | Hu | H04R 1/406 381/71.7 |
| 2012/0140947 | A1 | 6/2012 | Shin | |
| 2013/0142343 | A1* | 6/2013 | Matsui | G10L 21/028 381/56 |
| 2013/0316691 | A1 | 11/2013 | Forutanpour et al. | |
| 2013/0343571 | A1* | 12/2013 | Rayala | H04R 3/005 381/92 |
| 2014/0056435 | A1* | 2/2014 | Kjems | G10L 15/20 381/66 |
| 2014/0093093 | A1* | 4/2014 | Dusan | H04R 3/005 381/74 |
| 2014/0177857 | A1* | 6/2014 | Kuster | H04R 25/407 381/66 |
| 2014/0177868 | A1* | 6/2014 | Jensen | H04R 3/002 381/94.7 |
| 2015/0088500 | A1* | 3/2015 | Conliffe | G02C 11/10 704/235 |
| 2015/0170632 | A1* | 6/2015 | Olsson | G10K 11/175 381/71.6 |
| 2015/0172807 | A1* | 6/2015 | Olsson | G10K 11/175 381/74 |

OTHER PUBLICATIONS

PCT International Preliminary Report for Application No. PCT/US2014/045202 dated Dec. 1, 2016; 6 Pages.

* cited by examiner

Overlapping Beams

Postfilter Beampattern, f = 4kHz, $d_{mic}$ = 4cm

METHODS AND APPARATUS FOR BROADENED BEAMWIDTH BEAMFORMING AND POSTFILTERING

CROSS REFERENCE TO RELATED APPLICATIONS

This application is a National Stage application of PCT/US2014/045202 filed on Jul. 2, 2014, and entitled "METHODS AND APPARATUS FOR BROADENED BEAMWIDTH BEAMFORMING AND POSTFILTERING" which claims priority from U.S. Provisional Patent Application No. 62/000,137, filed on May 19, 2014, which are incorporated herein by reference.

BACKGROUND

As in known in the art, the demand for speech interfaces in the home and other environments is increasing. In these applications, the speaker cannot be assumed to be in the direct vicinity of the microphone(s). Therefore, the captured speech signal may be smeared by reverberation and other kinds of interferences, which can lead to a degradation of the automated speech recognition (ASR) accuracy.

Conventional beamformer-postfilter systems rely on the assumption that the speaker position is known, which may not be the case. For example, a sector with a twenty-five degree width can be created inside which the ASR performance is enhanced. Outside this "sweet spot," signals are suppressed so that if a speaker moves outside of the twenty-five degree sector, speech from the speaker may be suppressed.

In known systems, acoustic speaker localization can be used to steer the beam to the actual speaker position. This may not work robustly for scenarios in which reverberation and interference are present. Another known approach is to enable the beamformer to adapt to some extent to the true speaker position. However, this approach may be suboptimal. Speaker localization using a camera may not be a realistic option as a camera may not be available.

SUMMARY

Illustrative embodiments of the invention provide methods and apparatus for speech enhancement in distant talk scenarios, such as home automation. Using conventional beamforming techniques, optimal ASR accuracy may only be achieved in a limited spatial zone, e.g., right in front of a television plus/minus about fifteen degrees, which provides a 'sweet spot' for voice control. Illustrative embodiments of the invention enlarge this sweet spot significantly, for example to about sixty degrees, while retaining the benefits from speech enhancement processing, such as dereverberation and suppression of various kinds of interferences. With this arrangement, improved front-end processing for distant talk voice control is provided compared with conventional systems.

In one aspect of the invention, a method comprises: receiving a plurality of microphone signals from respective microphones; forming, using a computer processor, a first beam and generating a first beamformed signal, a first spatial activity detection signal and a first directional power spectral density signal from the plurality of microphone signals; forming a second beam and generating a second beamformed signal, a second spatial activity detection signal and a second directional power spectral density signal from the plurality of microphone signals; determining non-directional power spectral density signals from the plurality of microphone signals; determining whether speech received by the microphones is from a source located within the first and second beams or between the first and second beams; mixing the first and second beamformed signals, the first and second directional power spectral density signals and the non-directional power spectral density signals based upon the first and second spatial activity detection signals to generate a mixed beamformed signal and a mixed power spectral density signal; and performing postfiltering based on the mixed power spectral density signal, wherein spatial postfiltering is performed on the mixed beamformed signal when the source is within the first or second beams and non-spatial postfiltering is performed on the mixed beamformed signal when the source is in between the first and second beams.

The method can further include one or more of the following features: forming further beams and determining whether the speech received by the microphones is from a source located within or between the first, second or further beams, determining that the location of the source is between the first and second beams by detecting speech in adjacent spatial voice activity detection (SVAD) sectors, computing a fading factor from the first and second spatial activity detection signals for use in generating the mixed beamformed signal, using a single post filter module to perform the postfiltering, generating a power spectral density estimate comprising a reverberation estimate, generating a power spectral density estimate comprising a stationary noise estimate, performing non-spatial deverberation if the source is located between the first and second beams, using a blocking matrix to generate the first directional power spectral density signal, and/or including performing speech recognition on an output of the postfiltering.

In another aspect of the invention, an article comprises: a non-transitory computer-readable medium having stored instructions that enable a machine to: receive a plurality of microphone signals from respective microphones; form, using a computer processor, a first beam and generating a first beamformed signal, a first spatial activity detection signal and a first directional power spectral density signal from the plurality of microphone signals; form a second beam and generating a second beamformed signal, a second spatial activity detection signal and a second directional power spectral density signal from the plurality of microphone signals; determine non-directional power spectral density signals from the plurality of microphone signals; determine whether speech received by the microphones is from a source located within the first and second beams or between the first and second beams; mix the first and second beamformed signals, the first and second directional power spectral density signals and the non-directional power spectral density signals based upon the first and second spatial activity detection signals to generate a mixed beamformed signal and a mixed power spectral density signal; and perform postfiltering based on the mixed power spectral density signal, wherein spatial postfiltering is performed on the mixed beamformed signal when the source is within the first or second beams and non-spatial postfiltering is performed on the mixed beamformed signal when the source is in between the first and second beams.

The article can further include one or more of the following features: instructions to form further beams and determining whether the speech received by the microphones is from a source located within or between the first, second or further beams, instructions to determine that the location of the source is between the first and second beams by detecting speech in adjacent spatial voice activity detection (SVAD) sectors, instructions to compute a fading factor from the first and second spatial activity detection signals for use in generating the mixed beamformed signal, instructions to use a single post filter module to perform the postfiltering, instructions to generate a power spectral density estimate comprising a reverberation estimate, instructions to generate a power spectral density estimate comprising a stationary noise estimate, instructions to perform non-spatial deverberation if the source is located between the first and second beams, and/or instructions to use a blocking matrix to generate the first directional power spectral density signal.

In a further aspect of the invention, a system comprises: a processor; and a memory coupled to the processor, the processor and the memory configured to: receive a plurality of microphone signals from respective microphones; form, using a computer processor, a first beam and generating a first beamformed signal, a first spatial activity detection signal and a first directional power spectral density signal from the plurality of microphone signals; form a second beam and generating a second beamformed signal, a second spatial activity detection signal and a second directional power spectral density signal from the plurality of microphone signals; determine non-directional power spectral density signals from the plurality of microphone signals; determine whether speech received by the microphones is from a source located within the first and second beams or between the first and second beams; mix the first and second beamformed signals, the first and second directional power spectral density signals and the non-directional power spectral density signals based upon the first and second spatial activity detection signals to generate a mixed beamformed signal and a mixed power spectral density signal; and perform postfiltering based on the mixed power spectral density signal, wherein spatial postfiltering is performed on the mixed beamformed signal when the source is within the first or second beams and non-spatial postfiltering is performed on the mixed beamformed signal when the source is in between the first and second beams.

The system can further include the processor and memory be configured for one or more of the following features: form further beams and determining whether the speech received by the microphones is from a source located within or between the first, second or further beams, determine that the location of the source is between the first and second beams by detecting speech in adjacent spatial voice activity detection (SVAD) sectors, compute a fading factor from the first and second spatial activity detection signals for use in generating the mixed beamformed signal, use a single post filter module to perform the postfiltering, generate a power spectral density estimate comprising a reverberation estimate, generate a power spectral density estimate comprising a stationary noise estimate, perform non-spatial deverberation if the source is located between the first and second beams, and/or use a blocking matrix to generate the first directional power spectral density signal.

BRIEF DESCRIPTION OF THE DRAWINGS

The foregoing features of this invention, as well as the invention itself, may be more fully understood from the following description of the drawings in which:

FIG. 1 C is a representation of a speaker between first and second beams;

DETAILED DESCRIPTION

Figure 1:
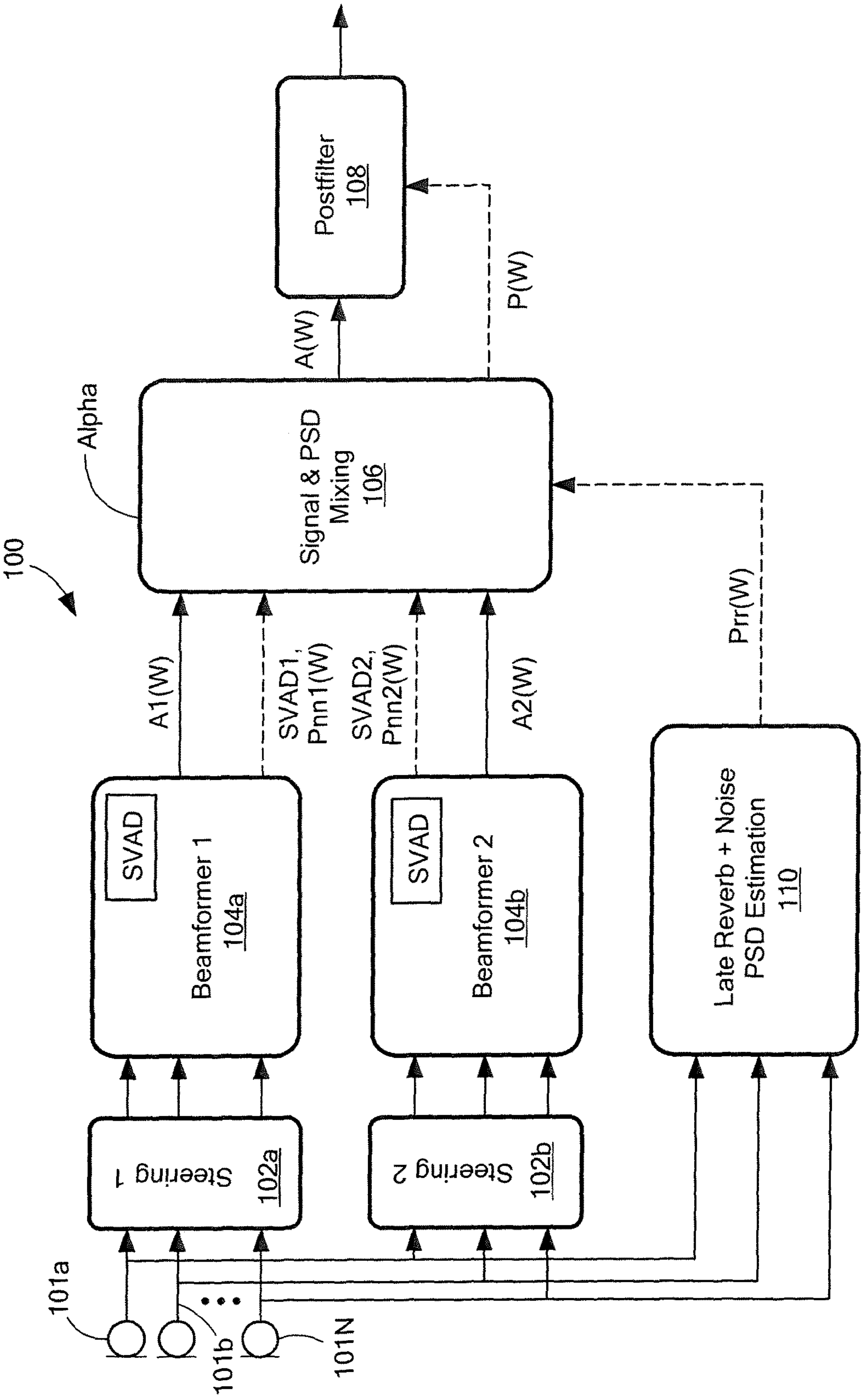
FIG. 1 is a schematic representation of a speech enhancement system having broadened beamwidth.

In general, illustrative embodiments of the invention provide multiple beamformers, e.g., two, that are steered apart, such as at about thirty degrees, from each other. The beamformer output signals are mixed using a dynamic mixing technique to obtain a single enhanced signal. The directional power spectral density signals are mixed as well and are applied in a postfilter to perform interference suppression and dereverberation. While this alone may result in a strong drop in ASR accuracy in between the two beams, a postfilter is controlled to act as de-reverberation filter when the speaker is found to be in between the two beams. The reason for the strong drop is that the directional PSDs are applied in the postfilter as a kind of baseline. Then, if the speaker is not exactly in the beam, there are distortions because speech leaks into the directional PSDs.

In one embodiment, the first and second beamformers may provide reverberation estimation as well as the signaling to control the characteristics of the filtering. Illustrative embodiments can include a double-beamforming/mixing/spatial postfilter configuration to widen the sweet spot and control the postfilter based on the two beamformers, such that substantially no loss in ASR accuracy is incurred in between the two beams. Control of the postfilter is such that late reverberation will be suppressed. Late reverberation is caused by sound reflection on the enclosure boundaries and arrives at the microphones after the direct sound component, e.g., after a certain propagation delay (about 30-50 ms). Late reverberation may be considered as diffuse sound whose energy decays exponentially. Depending on the room volume and absorption properties it may take up to 1 sec for the late reverb to decay about 60 dB (T60~1 sec).

In illustrative embodiments of the invention, the beamformer output signals are mixed to obtain a single enhanced signal. Spectral enhancement is then applied to the mixed signal, which is referred to here as postfiltering. The postfilter relies on a power-spectral-density (PSD) estimate $\Phi_{II}(e^{j\Omega\mu})$, which represents those signal components that are to be suppressed. Generation of the PSD estimate is discussed below in detail. In addition to mixing the beamformer signals, the relevant PSDs are also mixed. In one embodiment, the PSD mixing is performed such that the postfilter behaves as a conventional spatial postfilter if the speaker is actually found to be in the sweet spot of one of the beams. However, if the speaker is found to be in between two adjacent beams this spatial postfiltering may introduce degradations. As the speaker is then not covered sufficiently by any of the beams, the spatial noise PSD estimate may no longer be correct (speech components may leak into the noise estimate). Embodiments of the invention reduce the impact of the spatial noise estimate. In the mixing process another type of noise estimate is used which does not depend on spatial characteristics. This PSD estimate may comprise an estimate for the reverberation $\Phi_{rr}(e^{j\mu})$ or a stationary noise estimate $\Phi_{stat}(e^{j\mu})$ or another noise estimate, or a combination of noise estimates.

In one embodiment, PSD-mixing is controlled by Spatial Voice Activity Detection (SVAD), which is well known in the art. A SVAD detects whether a signal is received from a spatial direction $\theta_n$ (Hypothesis). SVADs are known for controlling adaptive beamformers. It is understood that one could use multiple beamformers, each with a dedicated spatial postfilter, and mix the output signals. This would also lead to a broadened effective beamwidth of the overall system. This, however, requires N spatial postfilters to be processed and would also require close steering of the beams to avoid speech distortion, in the case where the speaker is in between two beams.

In some embodiments of the invention, the beamformer output signals are mixed first, which leads to reduced computational load. Also, PSD-mixing is performed so that a single postfilter can be applied to the mixed signal. This is not only beneficial in terms of processing power but also enables spatial control of the resulting postfilter by SVADs. Controlling the PSD-mixing based on SVADs enables preserving the desired properties of spatial postfilters (spatial interference suppression and de-reverberation), while signal degradations can be avoided by performing de-reverberation if the speaker is found to be in between two adjacent beams (and hence inside the broadened resulting beam). The system can thereby achieve de-reverberation in a predefined angular sector, while signals from outside this widened sweet spot can still be suppressed strongly.

FIG. 1 shows an illustrative system 100 having first and second beamforming modules 104*a,b* that generate respective beams that are steered apart from each other, such as about thirty degrees apart, by respective first and second steering modules 102*a,b*, which receive signals from a series of microphones 101*a*-N. A first speech output signal A1(W) from the first beamformer 104*a* provides the speech signal for the first beam and a second speech output signal A2(W) from the second beamformer 104*b* provides the speech signal for the second beam. A first spatial voice activity detection signal SVAD1 is output from the first beamformer 104*a* and a second spatial voice activity detection signal SVAD2 is output from the second beamformer 104*b*. Power spectral density signals Pnn1(W), Pnn2(W) are also provided to the mixing module 106 by the respective first and second beamformers 104*a,b*. The beamformer output signals are provided to a mixing module 106 which processes signal and power spectral density (PSD) signals to obtain a single enhanced signal. A noise module 110 is also coupled to the microphones 101. In one embodiment, the noise module processes the microphone signals in non-directional way for late reverberation and noise power spectral density information Prr(W), which is provided to the mixer module 108.

It is understood that any practical number of microphones, steering modules, beamforming modules, and the like, can be used to meet the needs of a particular application.

A postfiltering module 108 processes the mixed output signals A(W), P(W) from the mixing module 106. In one embodiment, the postfiltering module 108 relies on a power spectral-density (PSD) estimate that is used to determine whether signal components should be suppressed, as discussed more fully below.

In one embodiment, the mixing module 108 generally behaves as a (prior art) spatial postfilter if the speaker is located in one of the beams. However, if the speaker is found to be in between two adjacent beams the PSD estimate is modified in order to perform de-reverberation only. It is understood that noise-reduction only, or a combination of de-reverberation and noise-reduction can be performed.

In one embodiment, PSD-mixing in the mixer module 106 is controlled by the spatial voice activity detection signals SVAD1,2 from the beamformers 104*a,b*. Controlling PSD-mixing based on SVAD is well known in the art. An SVAD provides detection of whether a signal is received from a pre-defined spatial direction. SVADs are well known for controlling adaptive beamformers.

In the illustrative embodiment, in addition to mixing the beamformed signals, PSD-mixing is performed by the mixing module 106 so that a single postfilter can be applied to the mixed signal. This is beneficial in terms of processing power and control of the resulting postfilter spatially (by means of SVADs).

Controlling the PSD-mixing in the mixing module 106 based on SVAD1,2 leads to preserving the desired properties of spatial postfilters (spatial interference suppression and de-reverberation), while signal degradations can be avoided by performing non-spatial noise reduction or dereverberation if the speaker is found to be between two adjacent beams, and thus, inside the broadened resulting beam. It is understood that noise-reduction only, or a combination of de-reverberation and noise-reduction can be performed. Embodiments of the system can achieve de-reverberation in a predefined angular sector whereas signals from outside this widened sweet spot can still be suppressed strongly.

Figure 1A:
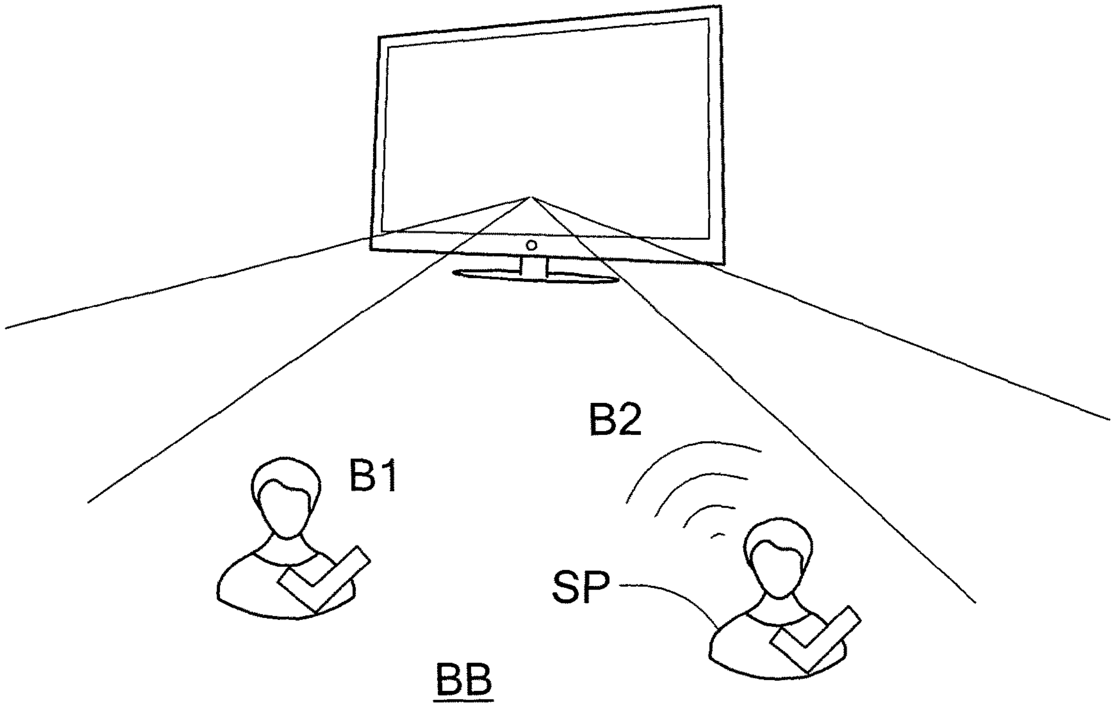
FIG. 1A is a representation of overlapping first and second beams.
Figure 1B:
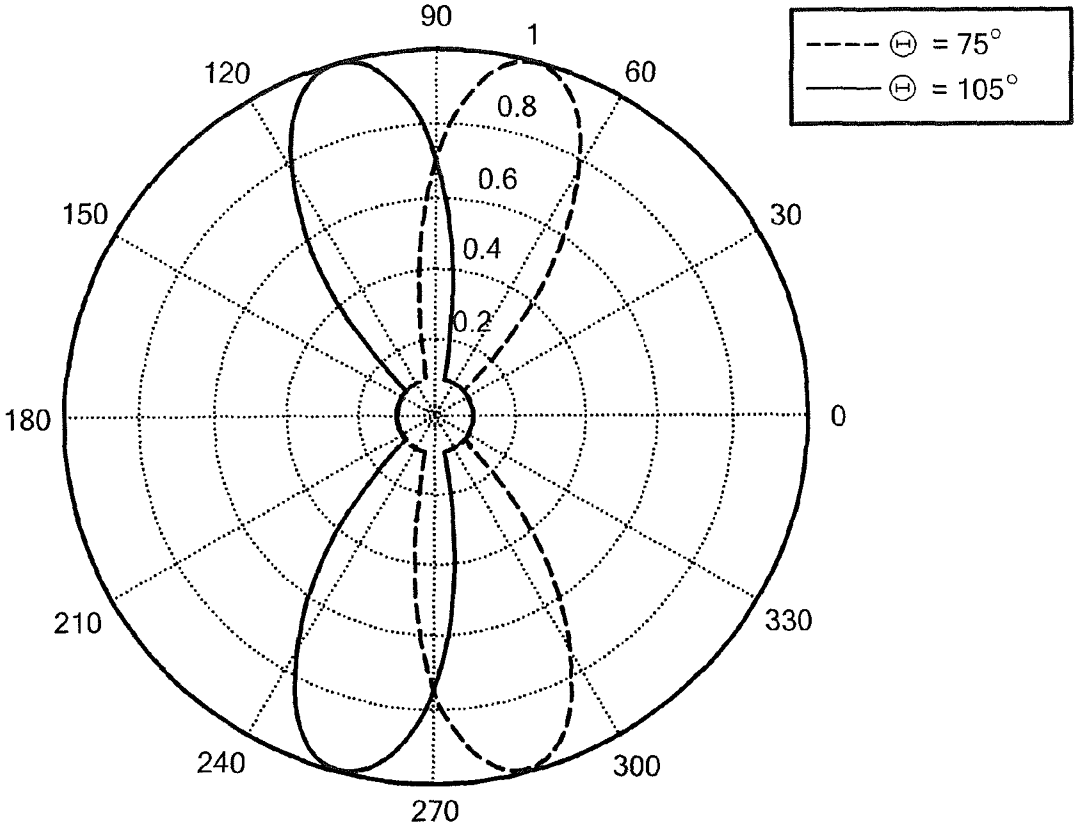
FIG. 1B is a graphical representation of a spatial postfilter beam pattern with overlapping beams.
Figure 1C:
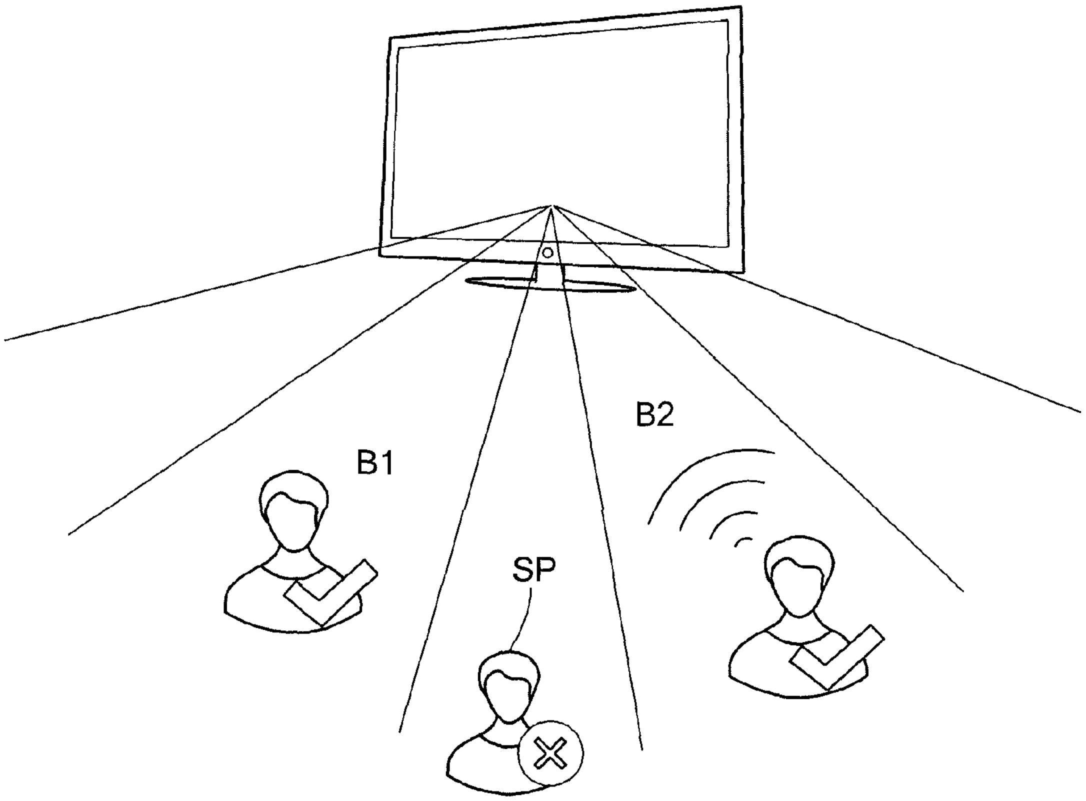
FIG. 1D is a graphical representation of speech recognition accuracy versus user position for a conventional beamwidth and a broadened beam.
Figure 1D:
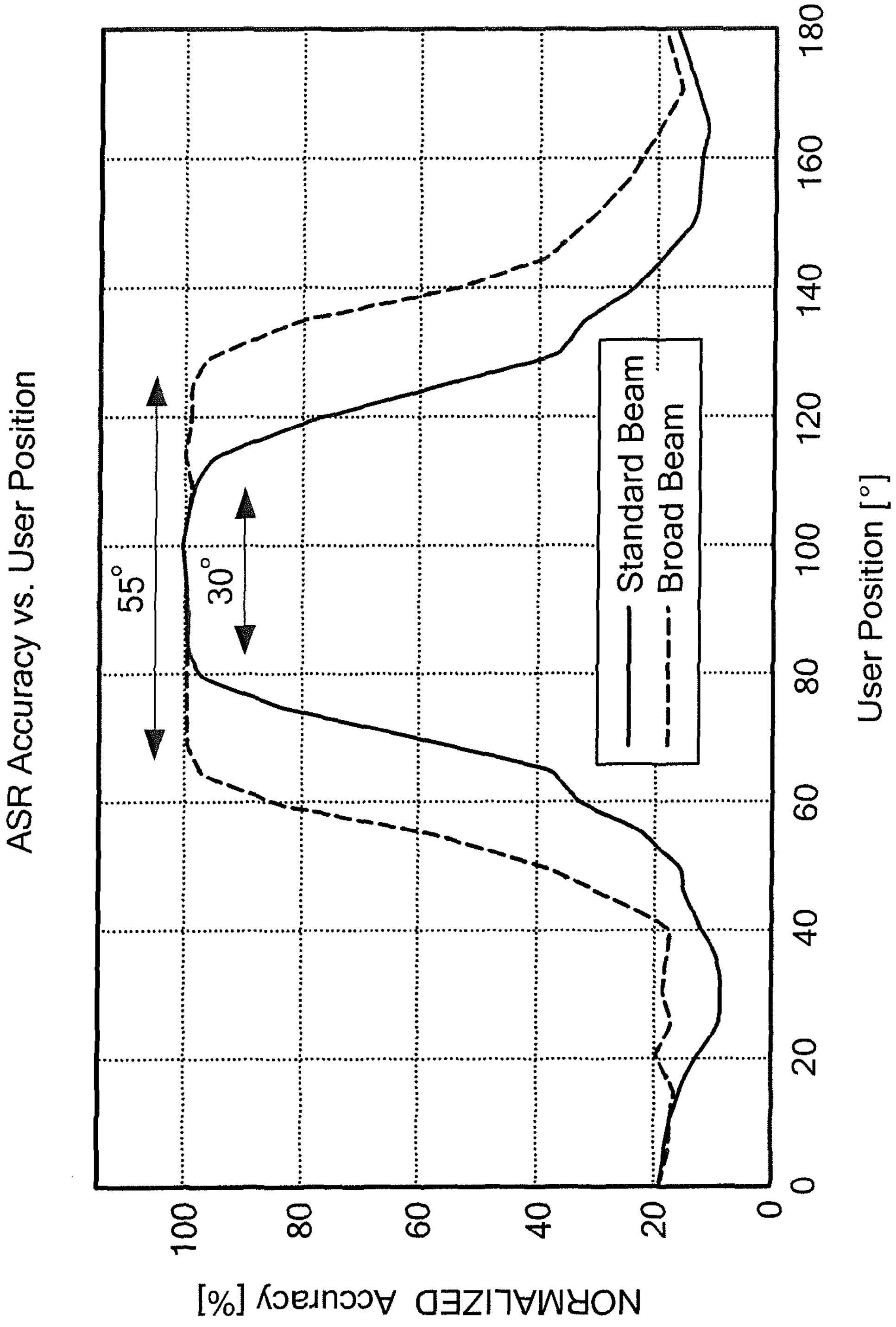

FIG. 1A shows a broadened beam BB comprising overlapping first and second beams B1, B2, such that there is no gap in between the beams. Since a speaker SP is within the broadened beam BB, ASR accuracy should be acceptable. FIG. 1B shows an illustrative spatial postfilter beam pattern for overlapping beams. As can be seen, beams are centered at 75 and 105 degrees with a microphone spacing of 4 cm at a frequency of 4 kHz. FIG. 1C shows a speaker SP in between first and second beams B1, B2. FIG. 1D shows automated speech recognition (ASR) accuracy versus user position for a standard beam and a broadened beam.

Figure 2:
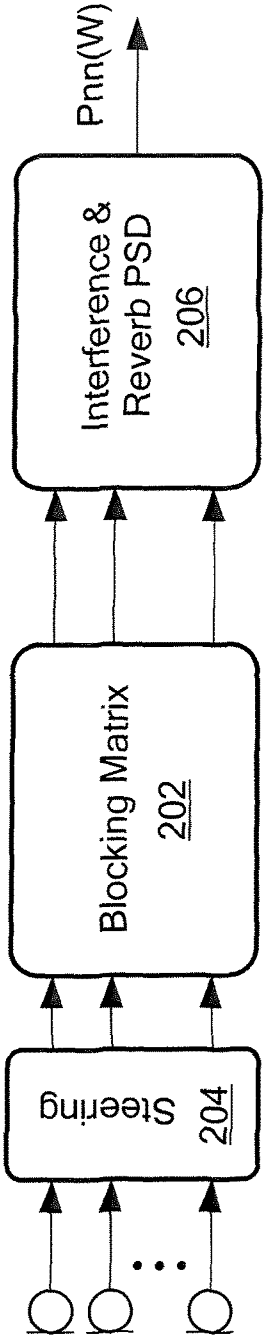
FIG. 2 is a schematic representation of a blocking matrix for generating a directional PSD.

FIG. 2 shows a generation of directional power spectral density 200 having a blocking matrix 202 receiving signals from a steering module 204 and a PSD module 206 receiving the output signals from the blocking matrix to generate a PSD output signal Pnn(W) for processing by the mixer module 106 (FIG. 1). It is understood that blocking matrixes are well known in the art. An illustrative blocking matrix and PSD module for interference and reverberation is shown and described in U.S. Pat. No. 8,705,759, which is incorporated herein by reference. Blocking matrices are applied to the vector of microphone signals and are designed such that a signal with some predefined, or assumed, properties (such as angle of incidence) is rejected completely. Generally a blocking matrix yields more than one output signal ($M \rightarrow K$), which is in contrast to beamforming ($M \rightarrow 1$).

Figure 3:
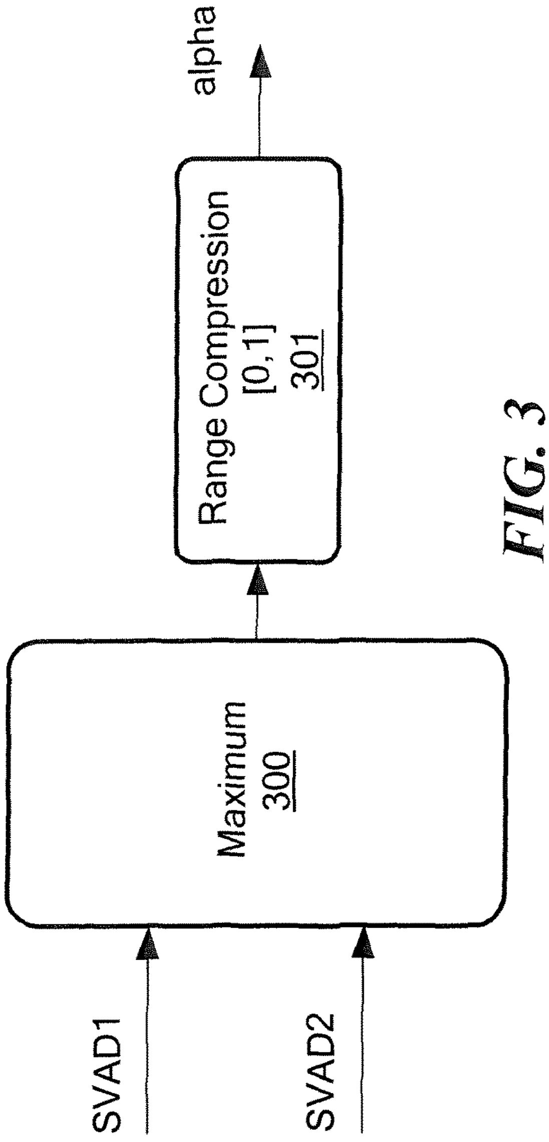
FIG. 3 is a schematic representation showing range compression to generate a fading factor.

FIG. 3 shows a portion 300 of the mixing module 106 (FIG. 1) receiving the voice activity detection signals SVAD1, SVAD2 from the first and second beamformers and a range compression module 301 to generate an output signal a that can be used in manner described below.

An illustrative embodiment in conjunction with above is now described. Let $\underline{W}(e^{j\Omega\mu})=(W_0(e^{j\Omega\mu}), \ldots, W_{M-1}(e^{j\Omega\mu}))^T$ be the vector of beamformer filters and $\underline{X}(e^{j\Omega\mu})=(X_0(e^{j\Omega\mu}), \ldots, X_{M-1}(e^{j\Omega\mu}))^T$ be the vector of complex valued microphone spectra. The beamformed signal can then be written as the inner product $$A(e^{j\Omega\mu})=\underline{W}^H(e^{j\Omega\mu})\underline{X}(e^{j\Omega\mu}) \tag{1}$$

The filters can be designed to meet the so called minimum variance distortionless response (MVDR) criterion:

$$\underset{W}{\operatorname{argmin}}\,\underline{W}^H(e^{j\Omega\mu})\Phi_{xx}(e^{j\Omega\mu})\underline{W}(e^{j\Omega\mu}),\text{ whereas } \underline{F}^H(e^{j\Omega\mu})\underline{W}(e^{j\Omega\mu}) \overset{!}{=} 1. \tag{2}$$

This design leads to the following filters:

$$\underline{W}(e^{j\Omega\mu})\,|_{MVDR} = \frac{\Phi_{vv}^{-1}(e^{j\Omega\mu})\underline{F}(e^{j\Omega\mu})}{\underline{F}^H(e^{j\Omega\mu})\Phi_{vv}^{-1}(e^{j\Omega\mu})\underline{F}(e^{j\Omega\mu})}. \tag{3}$$

These filters minimize the output variance under the constraint of no distortions given the acoustic transfer functions obey those assumed in $\underline{F}^H(e^{j\Omega\mu})$. Here, $\Phi_{vv}(e^{j\Omega\mu})$ denotes the covariance matrix of the noise at the microphones whereas $\Phi_{xx}(e^{j\Omega\mu})$ is the covariance matrix of the microphone signals. The vector $\underline{F}^H(e^{j\Omega\mu})$ is usually modeled under the assumption that no reflections are present in the acoustical environment and can therefore be described as a function of the steering angle $\theta$:

$$\underline{F}(e^{j\Omega\mu},\theta):=(\exp(j\Omega_\mu f_a\tau_0\cos(\theta)), \ldots, \exp(j\Omega_\mu f_a\tau_{M-1}\cos(\theta)))^T \tag{4}$$

The delays in this so-called steering vector ensure time aligned signals with respect to $\theta$ when its elements are applied individually to each of the microphone signals $X_m(e^{j\Omega\mu})$, m being the microphone index. Time-aligned signals will interfere constructively during beamforming ensuring the constraint. Thus, the steering vectors can be used to control the spatial angle for which the signal will be protected by the beamformer constraint.

At least N=2 beamformed signals $A_n(e^{j\Omega\mu})$, $n\in(1, \ldots, N)$ are computed, whereas their steering vectors $\underline{F}_n(e^{j\Omega\mu}, \theta_n)$ differ by some angle $\Delta$. The choice of $\Delta$ should be made depending on the microphone spacing, whereas a larger $\Delta$ is possible with smaller microphone spacings because this increases the width of each beam. To minimize N, the inter-beam spacing $\Delta$ should be chosen as large as possible, for example $\Delta=\pi/6$ (30 degrees) works well for an illustrative implementation.

Figure 4:
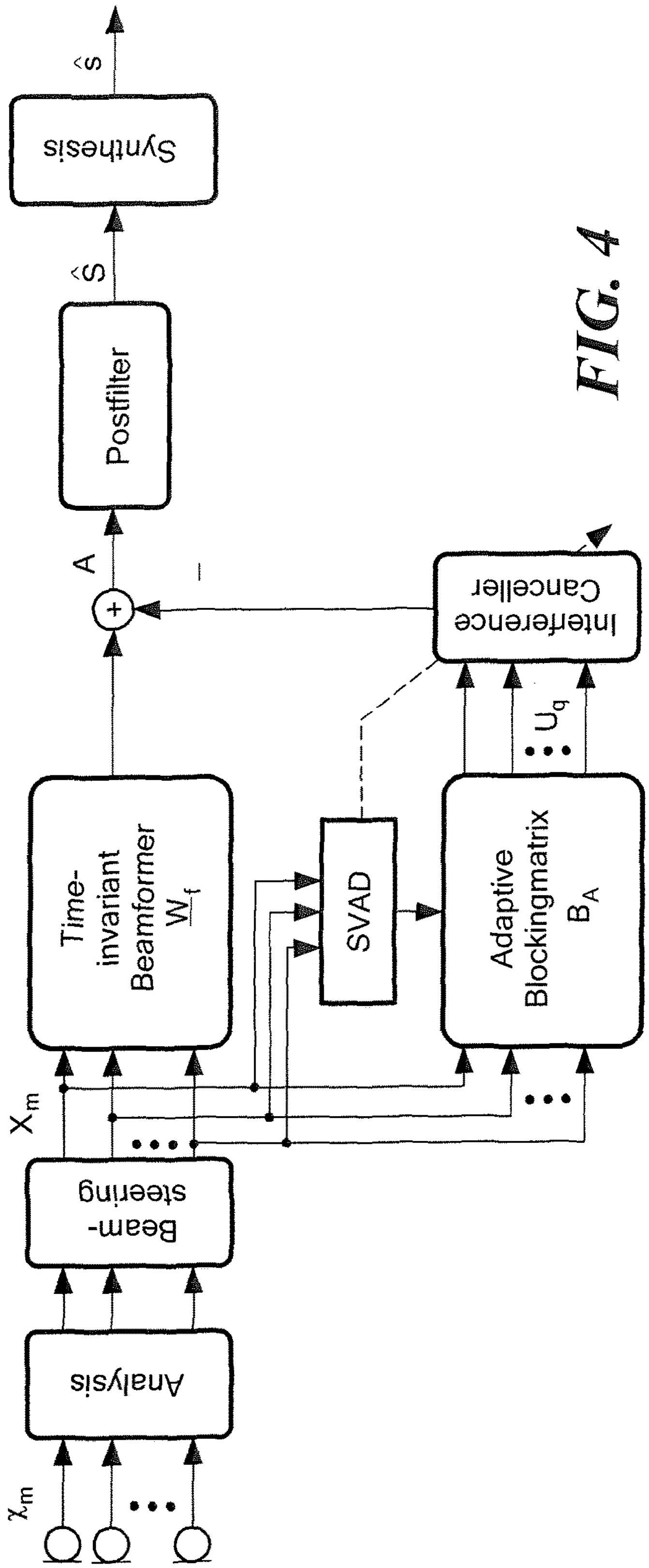
FIG. 4 is a schematic representation of an illustrative GSC beamformer.

It is understood that any suitable beamforming processing can be used, such as time invariant MVDR beamforming, adaptive GSC-type beamforming, etc. FIG. 4 shows an illustrative adaptive GSC (General Sidelobe Cancelling)-type beamformer. As both the GSC-type beamformer as well a spatial postfilter require a blocking matrix $B(e^{j\Omega\mu})$(a blocking matrix satisfies $B_n(e^{j\Omega\mu})\underline{F}(e^{j\Omega\mu}, \theta)=0$ and hence rejects the desired signal), the GSC-structure is well suited for embodiments of the invention.

It is understood that the mixing process described later may require estimates of different types of PSDs. Spatially pre-filtered PSDs for each beam are now described.

A noise reduction filter based on spectral enhancement requires a PSD representing the interfering signal components to be suppressed. In the case of a spatial postfilter this PSD has a blocking matrix as spatial preprocessor. There are various ways of generating a PSD, such as:

$$\Phi_{zz}^{(n)}(e^{j\Omega\mu}) = tr\{B_n(e^{j\Omega\mu})\Phi_{xx}(e^{j\Omega\mu})B_n^H(e^{j\Omega\mu})\}\cdot\frac{\underline{W}_n^H(e^{j\Omega\mu})J_{vv}(e^{j\Omega\mu})\underline{W}_n(e^{j\Omega\mu})}{tr\{B_n(e^{j\Omega\mu})J_{vv}(e^{j\Omega\mu})B_n^H(e^{j\Omega\mu})\}}. \tag{5}$$

On the right side of this equation the first trace tr is equivalent to the summed PSD after the blocking matrix, where the fraction on the far right is an equalization that corrects for the bias depending on the coherence matrix $J_{vv}(e^{j\Omega\mu})$ of the noise. It can either be estimated online or computed based on an assumed noise coherence. Spatial postfiltering is further shown and described in, for example, T. Wolff, M. Buck: *Spatial maximum a posteriori post-filtering for arbitrary beamforming*. Proceedings Hands-free Speech Communication and Microphone Arrays (HSCMA 2008), 53-56, Trento, Italy 2008, M. Buck, T. Wolff, T. Haulick, G. Schmidt: *A compact microphone array system with spatial post-filtering for automotive applications*. Proceedings International Conference on Acoustics, Speech, and Signal Processing (ICASSP 09), Taipei, Taiwan, 2009, T. Wolff, M. Buck: *A generalized view on microphone array postfilters*. International Workshop on Acoustic Echo and Noise Control (IWAENC 2010), Tel Aviv, Israel, August 2010, and T. Wolff, M. Buck: *Influence of blocking matrix design on microphone array postfilters*. International Workshop on Acoustic Echo and Noise Control (IWAENC 2010), Tel Aviv, Israel, August 2010, which are incorporated herein by reference.

In the present context, one property of $\Phi_{zz}^{(n)}(e^{j\Omega\mu})$ is that it does not contain desired signal components because they have been removed by the blocking matrix. The only speech component present in this PSD is the late reverberation which is why the spatial postfilter acts as a de-reverberation filter. The PSDs $\Phi_{zz}^{(n)}(e^{j\Omega\mu})$ would be used for spatial postfiltering if there was a dedicated spatial postfilter with every beamformer (e.g., in a known single beamformer-spatial-postfilter system).

The PSD of the stationary noise at the output of each beam is referred to here as $\Phi_{stat}^{(n)}(e^{j\Omega\mu})$. These PSDs can be estimated using any known method such as minimum statistics, IMCRA, and the like. It is understood that any suitable estimation technique can be used for the stationary noise PSD.

The PSD of the late reverberation $\Phi_{rr}(e^{j\Omega\mu})$ may be used as well. A variety of techniques are known in the art that are based on a statistical model of the late reverberation. Such estimators require at least an estimate of the reverberation time of the room (T—60). The reverberation time, however, can be estimated any suitable method well known in the art in illustrative embodiments of the invention. In general, $\Phi(n)_{rr}(e^{j\Omega\mu})$ may be estimated based on the multichannel microphone signals or based on the each beamformer output. The estimated PSDs represent the late reverberation at each beamformer output. The parameters of the reverb model may be estimated only once based on the multichannel signals.

Spatial Voice Activity Detection (SVAD) makes use of two or more microphone signals and computes a scalar value $\Upsilon_{SVAD}(\Theta_n)\in\Re$ that indicates whether sound is received from the angle $\Theta$ or not. This may for instance be implemented by computing the Sum-to-Difference-Ratio (SDR)

which is a power ratio between the output power of a fixed (time-invariant) beamformer $\underline{W}_n(e^{j\Omega_\mu})$ and a corresponding blocking matrix $B_n(e^{j\Omega_\mu})$:

$$SDR_n = \frac{2}{N_{DFT}} \sum_{\mu=0}^{N_{DFT}/2-1} G_{eq}(e^{j\Omega_\mu}) \frac{\underline{W}_n^H(e^{j\Omega_\mu})\Phi_{xx}(e^{j\Omega_\mu})\underline{W}_n(e^{j\Omega_\mu})}{B_n(e^{j\Omega_\mu})\Phi_{xx}(e^{j\Omega_\mu})B_n^H(e^{j\Omega_\mu})}. \quad (6)$$

Here, $N_{DFT}$ is the DFT-length and $G_{eq}(e^{j\Omega_\mu})$ is an equalization filter that is chosen such that $SDR_n=1$ during speech pauses (adaptively) or for a diffuse soundfield. Due to the blocking matrix in the denominator, the SDR will be large for sounds from the corresponding steering direction, as further described in O. Hoshuyama and A. Sugiyama, *Microphone Arrays*, Berlin, Heidelberg, New York: Springer, 2001, ch. *Robust Adaptive Beamforming*, which is incorporated herein by reference.

Figure 5A:
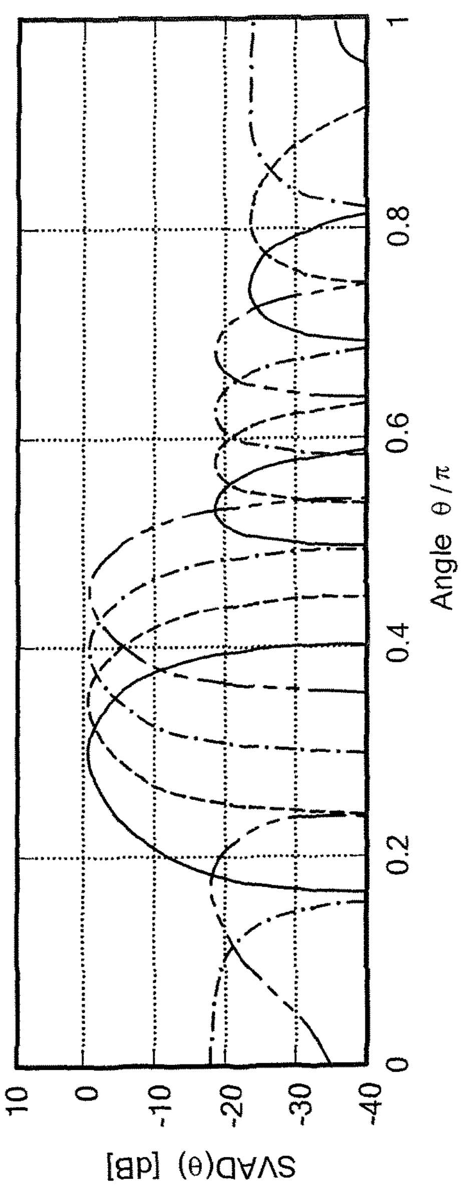
FIGS. 5A and 5B are graphical representations of spatial voice activity detection responses.
Figure 5B:
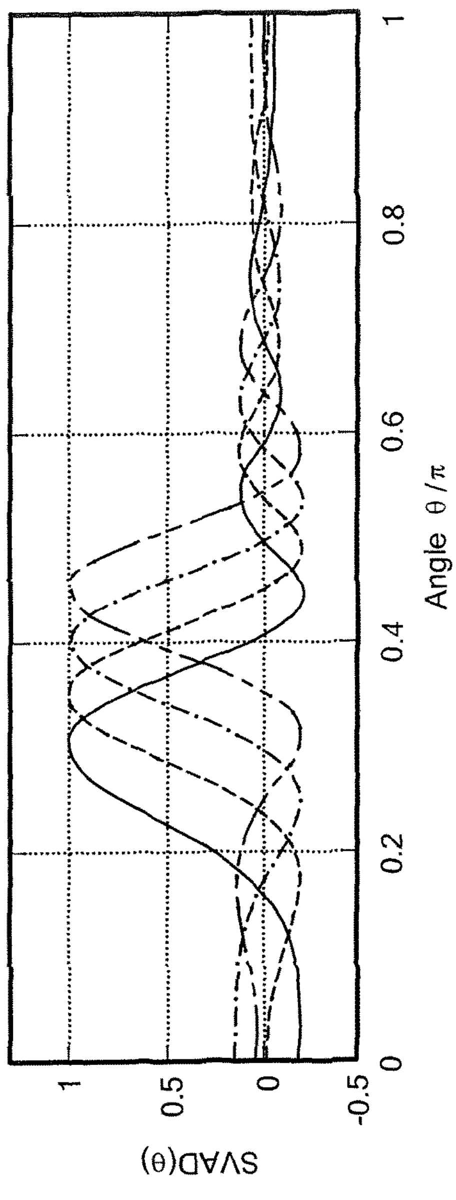

Another option is to evaluate the cross correlation function between two microphone signals for the time delay that corresponds to the angle of interest $\theta_n$:

$$r_{x_1x_2}(\theta_n) = \frac{2}{N_{DFT}} \mathrm{Re}\left\{ \sum_{\mu=0}^{N_{DFT}/2-1} S_{x_1x_2}(e^{j\Omega_\mu})\exp(j\Omega_\mu f_a \tau_0 \cos(\theta_n)) \right\} \quad (7)$$

Where Re{·} denotes the real part and $S_{x1x2}(e^{j\Omega_\mu})$ is the Cross Power Spectral Density between two microphone signals x1 and x2. FIGS. 5A and 5B shows the spatial response of $\Upsilon_{SVAD}(\Theta_n)$ as a function of the actual Direction-of-Arrival $\theta_{DOA}$ for different steering angles $\theta_n$.

Both $SDR_n$ and $r_{x1x2}(\theta_n)$ are suitable for SVAD processing. A SVAD signal $\Upsilon_{SVAD}(\Theta_n)$ is subject to thresholding to detect signal activity in a given time frame. In a GSC configuration, the SVAD information is usually used to control the interference cancellation and the update of an adaptive blocking matrix. In illustrative embodiments of the invention, it is used to control the process of PSD-mixing as described below.

The beamformed signals $A_n(e^{j\Omega_\mu})$ are assumed to be mixed by an arbitrary N→1 mixing stage which can generally be described as:

$$Y(e^{j\Omega_\mu}) = \sum_{n=1}^{N} G_n(e^{j\Omega_\mu}) \cdot |A_n(e^{j\Omega_\mu})| \cdot \mathcal{P}\{L(A_n(e^{j\Omega_\mu}))\} \quad (8)$$

As indicated, $G_n(e^{j\Omega_\mu}) \in \Re$ modifies the magnitude, whereas the operator $\mathcal{P}\{\cdot\}$ appends the phase. The mixing is thus generally a non-linear function of its input spectra. It is understood that any suitable mixing technique can be used in illustrative embodiments of the invention, such as those shown and described in, for example, Matheja_13: T. Matheja, M. Buck, T. Fingscheidt: *A Dynamic Multi-Channel Speech Enhancement System for Distributed Microphones in a Car Environment*, In: EURASIP, Journal on Advances in Signal Processing, Bd. 2013(191), 2013, T. Matheja, M. Buck, A. Eichentopf: *Dynamic Signal Combining for Distributed Microphone Systems In Car Environments*, In: Proc. IEEE International Conference on Acoustics, Speech, and Signal Processing (ICASSP), Prag, Tschechische Republik, Mai 2011, S. 5092-5095, and J. Freudenberger, S. Stenzel, B. Venditti: *Microphone Diversity Combining For In-Car Applications*, In: EURASIP Journal on Advances in Signal Processing, Bd. 2010, 2010: 1-13, S. 1-13, which are incorporated herein by reference.

In order to make the single postfilter (after the signal mixer) act as a spatial postfilter for each of the beams, the individual interference PSDs are mixed using the magnitude square of the amplitude mixer weights $G_n(e^{j\Omega_\mu})$:

$$\Phi_{zz}(e^{j\Omega_\mu}) = \sum_{n=1}^{N} |G_n(e^{j\Omega_\mu})|^2 \cdot \Phi_{zz}^{(n)}(e^{j\Omega_\mu}) \quad (9)$$

The phase operator of the mixer $\mathcal{P}\{\cdot\}$ is disregarded. As described above, using $\Phi_{zz}(e^{j\Omega_\mu})$ for the postfilter after the mixing may result in signal distortions if the speaker is actually in between (see FIG. 1C) two steering angles $\theta_n$ and $\theta_{n+1}$, given that $\Delta=\theta_n-\theta_{n+1}$ is large enough.

To reduce these undesired distortions, illustrative embodiments of the invention use a combination of $\Phi_{dd}(e^{j\Omega_\mu})$ and $\Phi_{zz}(e^{j\Omega_\mu})$, where the PSD $\Phi_{dd}(e^{j\Omega_\mu})$ can be $\Phi_{rr}(e^{j\Omega_\mu})$ or $\Phi_{stat}(e^{j\Omega_\mu})$ or a combination thereof (e.g. the sum). The PSDs $\Phi_{zz}(e^{j\Omega_\mu})$ and which when used in the postfilter would then result in late reverberation- and/or stationary noise suppression respectively. The reverb PSD $\Phi_{rr}(e^{j\Omega_\mu})$ and the stationary noise PSD $\Phi_{stat}(e^{j\Omega_\mu})$ are obtained in the same way as $\Phi_{zz}(e^{j\Omega_\mu})$:

$$\Phi_{rr}(e^{j\Omega_\mu}) = \sum_{n=1}^{N} |G_n(e^{j\Omega_\mu})|^2 \cdot \Phi_{rr}^{(n)}(e^{j\Omega_\mu}), \text{ and} \quad (10)$$

$$\Phi_{stat}(e^{j\Omega_\mu}) = \sum_{n=1}^{N} |G_n(e^{j\Omega_\mu})|^2 \cdot \Phi_{stat}^{(n)}(e^{j\Omega_\mu}) \quad (11)$$

One choice for the combination of $\Phi_{zz}(e^{j\Omega_\mu})$ and $\Phi_{dd}(e^{j\Omega_\mu})$, however, is a linear combination, whereas other more sophisticated embodiments are contemplated, such as:

$$\Phi_{II}(e^{j\Omega_\mu})=\alpha\cdot\Phi_{dd}(e^{j\Omega_\mu})+(1-\alpha)\cdot\Phi_{uu}(e^{j\Omega_\mu}) \quad (12)$$

In the above equation, α is a scalar real-valued factor which is computed based on SVAD information in every frame as follows. Generally, α is set to zero, except if any two adjacent SVADs, $\Upsilon_{SVAD}(\theta_\kappa)$ and $\Upsilon_{SVAD}(\theta_n)$ both indicate speech. It is then assumed that the speaker is actually in between the two respective beams. The fading factor α can then be computed as:

$$\alpha = C_{0,1}\left\{1 - \frac{1}{\max(\Upsilon_{SVAD}(\theta_\kappa), \Upsilon_{SVAD}(\theta_\nu))}\right\} \quad (13)$$

otherwise α=0. The operator C0,1{·} limits the range of its argument to (0, 1) so α can be used in Eq. 12, which maps the SVAD output(s) to values in (0, 1). It is understood that any suitable mappings can be used (see also FIG. 3).

Alternatively, only one SVAD $\Upsilon_{SVAD}(\theta^*)$ is used in Eq. 12, with $\theta^*=(\theta_n+\theta_{n+1})/2$. The SVAD is then steered directly in between two adjacent beamformer steering angles. Eq. 12 can then be used directly without prior detection of whether the observed speech is actually received from in between the adjacent beams. While $\Upsilon_{SVAD}(\theta_n)$ may already be available in a practical beamformer, $\Upsilon_{SVAD}(\theta^*)$ may have to be implemented in addition.

The PSD-mixing process described above, allows for a larger inter beam spacing as compared to mixing N beamformer-spatial-postfilter outputs, which would require close beamsteering and many beams and associated larger overhead than embodiments of the present invention.

In general, the postfilter can be implemented using any number of practical noise reduction filtering schemes well known in the art, such as Wiener Filter, Ephraim-Malah Filter, Log-Spectral Amplitude Estimation, and the like. The interference PSD $\Phi_{II}(e^{j\Omega\mu})$ of Eq. 12 can be used as a noise PSD estimator.

Figure 6:
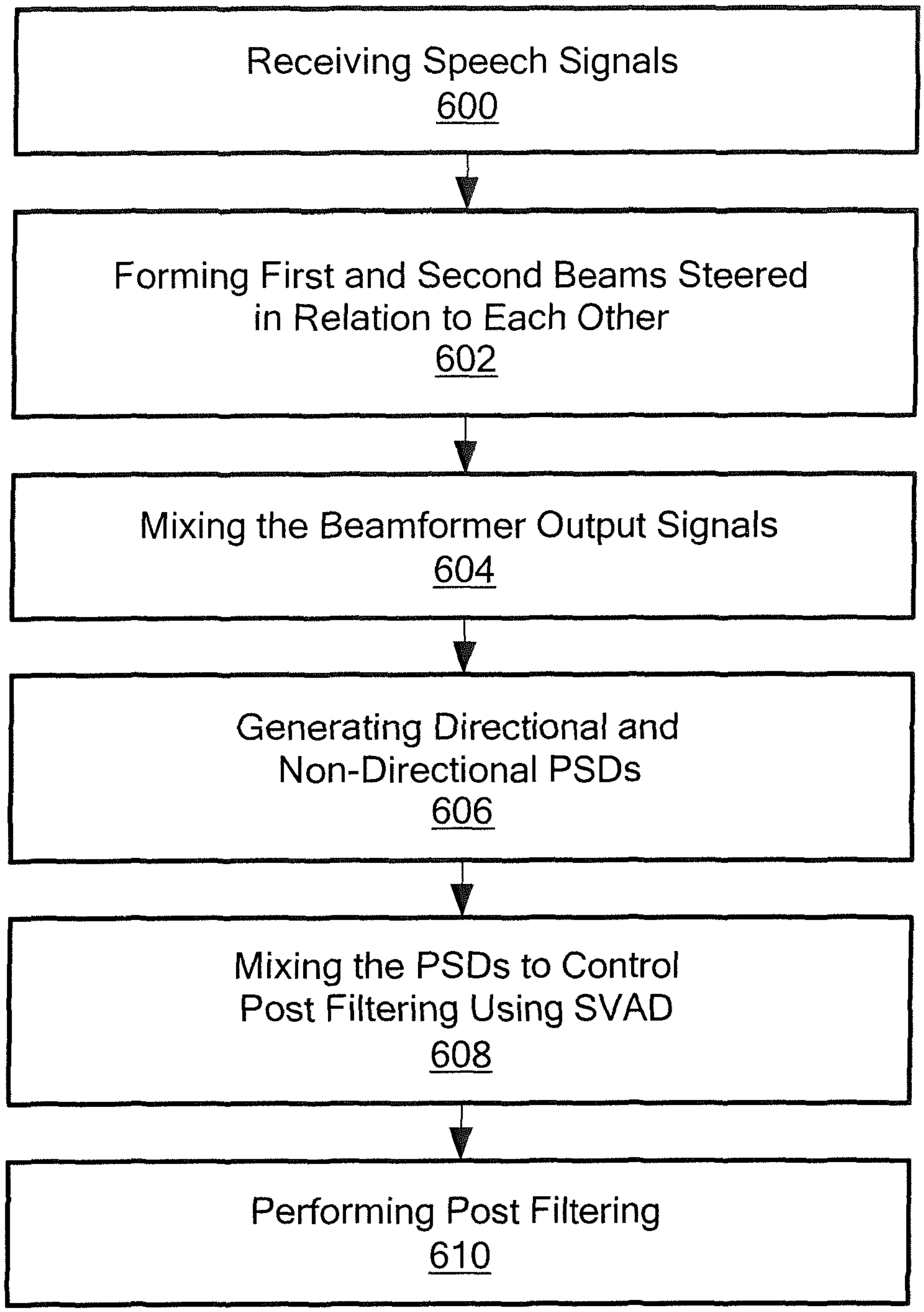
FIG. 6 is a flow diagram showing an illustrative sequence to provide speech enhancement with broadened beamwidth.

FIG. 6 shows an illustrative sequence to provide speech enhancement with broadened beamwidth. In step 600, speech from a speaker is received at a plurality of microphones to generate microphone signals. In step 602, first and second beamformers are steered to form beams in relation to each other from which first and second beamformed signals are generated. The first and second beams widen the 'sweet spot' in which speech can be automatically recognized with a given level of accuracy. The beamformer output signals are mixed in step 604. In step 606, directional and non-directional interference signals are estimated by power spectral densities (PSDs), which are provided to a mixer. In step 608, the directional and non-directional PSDs are mixed using spatial voice activity detection to control postfiltering, which is performed in step 610. In one embodiment, de-reverberation is performed when the speaker is located between the first and second beams.

Figure 7:
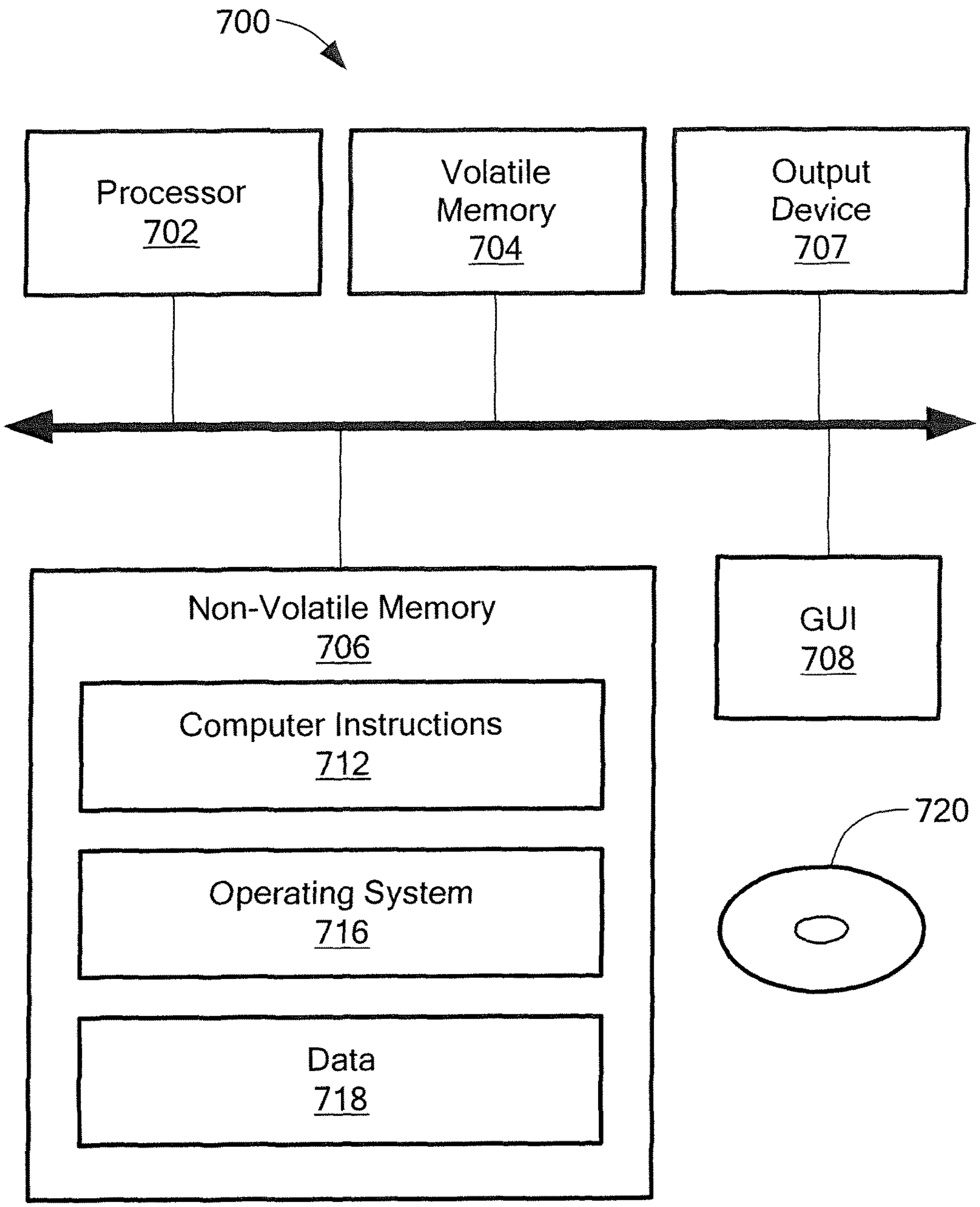
FIG. 7 is a schematic representation of an exemplary computer that can perform at least a portion of the processing described herein.

FIG. 7 shows an exemplary computer 700 that can perform at least part of the processing described herein. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices.

Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

The invention claimed is:

1. A method, comprising:

receiving a plurality of microphone signals from respective microphones, wherein the microphone signals comprise speech from a speaker with a command for an action to be taken by a system having an automatic speech recognition (ASR) system;

forming, using a computer processor, a first beam and generating a first beamformed signal, a first spatial activity detection signal and a first directional power spectral density signal from the plurality of microphone signals;

forming a second beam and generating a second beamformed signal, a second spatial activity detection signal and a second directional power spectral density signal from the plurality of microphone signals;

determining non-directional power spectral density signals from the plurality of microphone signals;

determining whether speech received by the microphones is from a source located within the first and second beams or between the first and second beams;

mixing the first and second beamformed signals, the first and second directional power spectral density signals and the non-directional power spectral density signals based upon the first and second spatial activity detection signals to generate a mixed beamformed signal and a mixed power spectral density signal;

performing postfiltering based on the mixed power spectral density signal, wherein spatial postfiltering is performed on the mixed beamformed signal when the source is within the first or second beams and non-spatial postfiltering is performed on the mixed beamformed signal when the source is in between the first and second beams; and performing automatic speech recognition after the postfiltering and implementing, by the system, the command from the speaker.

2. The method according to claim 1, further including forming further beams and determining whether the speech received by the microphones is from a source located within or between the first, second or further beams.

3. The method according to claim 1, further including determining that the location of the source is between the first and second beams by detecting speech in adjacent spatial voice activity detection (SVAD) sectors.

4. The method according to claim 1, further including computing a fading factor from the first and second spatial activity detection signals for use in generating the mixed beamformed signal.

5. The method according to claim 1, further using a single post filter module to perform the postfiltering.

6. The method according to claim 1, further including generating a power spectral density estimate comprising a reverberation estimate.

7. The method according to claim 6, further including generating a power spectral density estimate comprising a stationary noise estimate.

8. The method according to claim 1, further including performing non-spatial deverberation if the source is located between the first and second beams.

9. The method according to claim 1, further including using a blocking matrix to generate the first directional power spectral density signal.

10. The method according to claim 1, further including performing speech recognition on an output of the postfiltering.

11. An article, comprising:

a non-transitory computer-readable medium having stored instructions that enable a machine to:

receive a plurality of microphone signals from respective microphones, wherein the microphone signals comprise speech from a speaker with a command for an action to be taken by a system having an automatic speech recognition (ASR) system;

form, using a computer processor, a first beam and generating a first beamformed signal, a first spatial activity detection signal and a first directional power spectral density signal from the plurality of microphone signals;

form a second beam and generating a second beamformed signal, a second spatial activity detection signal and a second directional power spectral density signal from the plurality of microphone signals;

determine non-directional power spectral density signals from the plurality of microphone signals;

determine whether speech received by the microphones is from a source located within the first and second beams or between the first and second beams;

mix the first and second beamformed signals, the first and second directional power spectral density signals and the non-directional power spectral density signals based upon the first and second spatial activity detection signals to generate a mixed beamformed signal and a mixed power spectral density signal;

perform postfiltering based on the mixed power spectral density signal, wherein spatial postfiltering is performed on the mixed beamformed signal when the source is within the first or second beams and non-spatial postfiltering is performed on the mixed beamformed signal when the source is in between the first and second beams; and perform automatic speech recognition after the postfiltering and implementing, by the system, the command from the speaker.

12. The article according to claim 11, further including instructions to form further beams and determining whether the speech received by the microphones is from a source located within or between the first, second or further beams.

13. The article according to claim 11, further including instructions to determine that the location of the source is between the first and second beams by detecting speech in adjacent spatial voice activity detection (SVAD) sectors.

14. The article according to claim 11, further including instructions to compute a fading factor from the first and second spatial activity detection signals for use in generating the mixed beamformed signal.

15. The article according to claim 11, further instructions to use a single post filter module to perform the postfiltering.

16. The article according to claim 11, further including instructions to generate a power spectral density estimate comprising a reverberation estimate.

17. The article according to claim 16, further including instructions to generate a power spectral density estimate comprising a stationary noise estimate.

18. The article according to claim 11, further including instructions to perform non-spatial deverberation if the source is located between the first and second beams.

19. The article according to claim 11, further including instructions to use a blocking matrix to generate the first directional power spectral density signal.

20. A system, comprising:

a processor; and a memory coupled to the processor, the processor and the memory configured to: receive a plurality of microphone signals from respective microphones, wherein the microphone signals comprise speech from a speaker with a command for an action to be taken by the system which includes an automatic speech recognition (ASR) system;

form, using a computer processor, a first beam and generating a first beamformed signal, a first spatial activity detection signal and a first directional power spectral density signal from the plurality of microphone signals;

form a second beam and generating a second beamformed signal, a second spatial activity detection signal and a second directional power spectral density signal from the plurality of microphone signals;

determine non-directional power spectral density signals from the plurality of microphone signals;

determine whether speech received by the microphones is from a source located within the first and second beams or between the first and second beams;

mix the first and second beamformed signals, the first and second directional power spectral density signals and the non-directional power spectral density signals based upon the first and second spatial activity detection signals to generate a mixed beamformed signal and a mixed power spectral density signal;

perform postfiltering based on the mixed power spectral density signal, wherein spatial postfiltering is performed on the mixed beamformed signal when the source is within the first or second beams and non-spatial postfiltering is performed on the mixed beamformed signal when the source is in between the first and second beams; and perform automatic speech recognition after the postfiltering and implementing, by the system, the command from the speaker.

* * * * *